US012369135B2

(12) United States Patent
Ren et al.

(10) Patent No.: US 12,369,135 B2
(45) Date of Patent: Jul. 22, 2025

(54) INFORMATION TRANSMISSION METHOD AND DEVICE

(71) Applicant: DATANG MOBILE COMMUNICATIONS EQUIPMENT CO., LTD., Beijing (CN)

(72) Inventors: Bin Ren, Beijing (CN); Ren Da, Beijing (CN); Xiaotao Ren, Beijing (CN); Gang Li, Beijing (CN); Hui Li, Beijing (CN); Zheng Zhao, Beijing (CN); Zhenyu Zhang, Beijing (CN); Rongyi Fang, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 406 days.

(21) Appl. No.: 17/802,526

(22) PCT Filed: Jan. 19, 2021

(86) PCT No.: PCT/CN2021/072713
§ 371 (c)(1),
(2) Date: Aug. 26, 2022

(87) PCT Pub. No.: WO2021/169676
PCT Pub. Date: Sep. 2, 2021

(65) Prior Publication Data
US 2023/0100877 A1 Mar. 30, 2023

(30) Foreign Application Priority Data

Feb. 26, 2020 (CN) .......................... 202010118425.8

(51) Int. Cl.
H04W 64/00 (2009.01)
H04L 5/00 (2006.01)
H04W 24/08 (2009.01)

(52) U.S. Cl.
CPC ........... *H04W 64/00* (2013.01); *H04L 5/0048* (2013.01); *H04L 5/0094* (2013.01); *H04W 24/08* (2013.01)

(58) Field of Classification Search
CPC . H04W 64/00; H04W 64/003; H04W 72/543; G01S 5/00
See application file for complete search history.

(56) References Cited

U.S. PATENT DOCUMENTS

2018/0217228 A1* 8/2018 Edge ..................... H04W 64/00
2019/0045477 A1 2/2019 Edge

FOREIGN PATENT DOCUMENTS

CN 105472735 A 4/2016
CN 107852582 A 3/2018
(Continued)

Primary Examiner — Benyam Haile
(74) Attorney, Agent, or Firm — KILPATRICK TOWNSEND & STOCKTON LLP

(57) ABSTRACT

Disclosed in the present application are an information transmission method and device, for use in implementing integrity monitoring of a downlink 3GPP RAT-dependent positioning network, to eliminate the influence of factors such as time offset of a base station, transmitter failure of the base station, a multipath channel, and a non-line-of-sight path channel. The information transmission method provided by the present application includes obtaining downlink positioning reference signal (PRS) parameter configuration information; measuring a downlink PRS from a base station on the basis of the downlink PRS parameter configuration information, and generating an error correction parameter ECP; and sending the ECP.

5 Claims, 7 Drawing Sheets

(56) References Cited

FOREIGN PATENT DOCUMENTS

| | | | |
|---|---|---|---|
| CN | 109923842 | A | 6/2019 |
| CN | 110192117 | A | 8/2019 |
| CN | 110346754 | A | 10/2019 |
| CN | 110635876 | A | 12/2019 |
| CN | 110651512 | A | 1/2020 |
| CN | 110719630 | A | 1/2020 |

\* cited by examiner

INFORMATION TRANSMISSION METHOD AND DEVICE

CROSS-REFERENCE OF RELATED APPLICATIONS

The present application is a National Stage of International Application No. PCT/CN2021/072713, filed Jan. 19, 2021, which claims the priority from Chinese Patent Application No. 202010118425.8, filed with the China National Intellectual Property Administration on Feb. 26, 2020 and entitled "Information communication Method and Device", which is hereby incorporated by reference in its entirety.

FIELD

The present application relates to the field of communication technologies, and particularly to an information communication method and device.

BACKGROUND

The positioning system outside the 3rd Generation Partnership Project (3GPP) standard protocol architecture has introduced the concept of integrity. For example: in the positioning and navigation applications in the Global Navigation Satellite System (GNSS) civil aviation system, the integrity is the information provided by the entire system to measure the confidence level of the positioning accuracy. The typical technologies of GNSS Integrity Monitoring (IM) includes integrity monitoring methods, such as the Satellite Based Augmentation System (SBAS) mechanism, Ground Based Augmentation System (GBAS) mechanism, and Receiver Autonomous Integrity Monitoring (RAIM) mechanism. The RAIM implements integrity monitoring by performing calculations inside the user receiver using the redundant information of the GNSS. The integrity monitoring may be divided into two categories: (1) only for monitoring whether the integrity is satisfied, with no error correction function; (2) in addition to monitoring whether the integrity is satisfied, there is also the error correction function.

However, the concept of positioning integrity has not been introduced but only the Quality of Service (QoS) requirements of the positioning service are defined under the current 3GPP standard protocol architecture, where the QoS requirements include the accuracy requirement for the horizontal position and the accuracy requirement for the vertical position under a certain confidence level.

To sum up, there is no concept of positioning service integrity under the current 3GPP standard protocol architecture, so there is no integrity monitoring function of the downlink 3GPP RAT-dependent positioning network. Therefore, the influence of factors such as the time offset of the base station, the failure of the base station transmitter, the multipath channel and the Non-Line of Sight (NLOS) channel cannot be eliminated.

SUMMARY

Embodiments of the present application provide an information communication method and device, and to realize the integrity monitoring of the downlink 3GPP RAT-dependent positioning network, and thus eliminate the influence of factors such as the time offset of the base station, the failure of the base station transmitter, the multipath channel and the non-line of sight channel.

On the network side, for example, on the Integrity Monitoring, IM, reference device side, an information communication method provided by an embodiment of the present application includes:

obtaining downlink Positioning Reference Signal (PRS) parameter configuration information;

measuring a downlink PRS from a base station based on the downlink PRS parameter configuration information;

generating an Error Correction Parameter (ECP); and sending the ECP.

With this method, the downlink PRS parameter configuration information is obtained, the downlink PRS from the base station is measured based on the downlink PRS parameter configuration information, the ECP is generated, and the ECP is sent, to realize the integrity monitoring of the downlink 3GPP RAT-dependent positioning network, and eliminating the influence of factors such as the time offset of the base station, the failure of the base station transmitter, the multipath channel and the non-line of sight channel.

In some embodiments, the ECP includes three types of ECP:

Type 1: a correction value for correcting a first positioning measurement of the downlink PRS sent by each downlink PRS beam of a candidate base station;

Type 2: an estimation of an error range of a first positioning measurement of the downlink PRS sent by each downlink PRS beam of a candidate base station; or Type 3: an identifier for determining whether a downlink PRS sent by each downlink PRS beam of a candidate base station satisfies an integrity monitoring condition.

In some embodiments, the method further includes receiving ECPs sent by preset Integrity Monitoring, IM, reference devices; and obtaining a synthesized ECP by performing a combined calculation on the ECPs of preset IM reference devices;

the sending the ECP, includes sending the synthesized ECP.

In some embodiments, the sending the ECP includes sending the ECP to a Location Management Function (LMF) entity or a terminal.

In some embodiments, the sending the ECP includes sending the ECP to a preset IM reference device, which a synthesized ECP is obtained by the preset IM reference device via performing a combined calculation on ECPs from preset IM reference devices.

On the LMF entity side, an information communication method provided by an embodiment of the present application includes:

sending downlink PRS parameter configuration information;

receiving an ECP; where the ECP is determined based on a downlink PRS corresponding to the downlink PRS parameter configuration information.

In some embodiments, the ECP includes three types of ECP:

Type 1: a correction value for correcting a first positioning measurement of the downlink PRS sent by each downlink PRS beam of a candidate base station;

Type 2: an estimation of an error range of a first positioning measurement of the downlink PRS sent by each downlink PRS beam of a candidate base station; or Type 3: an identifier for determining whether a downlink PRS sent by each downlink PRS beam of a candidate base station satisfies a preset integrity monitoring condition.

In some embodiments, the method further includes:

determining a second positioning measurement according to the ECP and the first positioning measurement reported by a terminal;

determining a terminal position based on the second positioning measurement.

In some embodiments, for the Type 1 of the ECP, the second positioning measurement is determined based on the first positioning measurement reported by the terminal in a following manner:

$$TDOA\_v2=TDOA\_v1-ECP\_TDOA\_Error;$$

where TDOA_v1 represents the first positioning measurement, ECP_TDOA_Error represents the correction value, and TDOA_v2 represents the second positioning measurement.

In some embodiments, for the Type 2 of the ECP, the second positioning measurement is determined based on the first positioning measurement reported by the terminal in a following manner:

taking the first positioning measurement as the second positioning measurement in case that the estimation of the error range is less than a preset threshold value.

In some embodiments, for the Type 3 of the ECP, the second positioning measurement is determined based on the first positioning measurement reported by the terminal in a following manner:

taking the first positioning measurement as the second positioning measurement in response to the identifier indicating that the downlink PRS satisfies the preset integrity monitoring condition.

In some embodiments, the method further includes:

receiving terminal position information reported by a terminal.

On the terminal side, an information communication method provided by an embodiment of the present application includes:

obtaining downlink PRS parameter configuration information from an LMF entity; and obtaining a first positioning measurement by measuring a downlink PRS based on the downlink PRS parameter configuration information.

In some embodiments, the method further includes:

reporting the first positioning measurement to the LMF entity.

In some embodiments, the method further includes:

receiving an ECP;

determining a second positioning measurement based on the ECP and the first positioning measurement;

determining terminal position information based on the second positioning measurement; and reporting the terminal position information to the LMF entity.

In some embodiments, the ECP includes three types of ECP:

Type 1: a correction value for correcting a first positioning measurement of the downlink PRS sent by each downlink PRS beam of a candidate base station;

Type 2: an estimation of an error range of a first positioning measurement of the downlink PRS sent by each downlink PRS beam of a candidate base station; or Type 3: an identifier for determining whether a downlink PRS sent by each downlink PRS beam of a candidate base station satisfies a preset integrity monitoring condition.

In some embodiments, for the Type 1 of the ECP, the second positioning measurement is determined based on the ECP and the first positioning measurement in a following manner:

$$TDOA\_v2=TDOA\_v1-ECP\_TDOA\_Error;$$

where TDOA_v1 represents the first positioning measurement, ECP_TDOA_Error represents the correction value corresponding to the ECP, and TDOA_v2 represents the second positioning measurement.

In some embodiments, for the Type 2 of the ECP, the second positioning measurement is determined based on the ECP and the first positioning measurement in a following manner:

taking the first positioning measurement as the second positioning measurement in case that the estimation of the error range is less than a preset threshold value.

In some embodiments, for the Type 3 of the ECP, the second positioning measurement is determined based on the ECP and the first positioning measurement in a following manner:

taking the first positioning measurement as the second positioning measurement in response to the identifier indicating that the downlink PRS satisfies the preset integrity monitoring condition.

On the base station side, an information communication method provided by an embodiment of the present application includes:

obtaining downlink PRS parameter configuration information from an LMF entity; and sending a downlink PRS to a terminal and a preset IM reference device based on the downlink PRS parameter configuration information.

In the IM reference device, an information communication device provided by an embodiment of the present application includes:

a memory configured to store program instructions;

a processor configured to invoke the program instructions stored in the memory and the program instructions, when executed by the processor, cause the processor to perform a process of:

obtaining downlink PRS parameter configuration information;

measuring a downlink PRS from a base station based on the downlink PRS parameter configuration information;

generating an ECP; and sending the ECP.

In some embodiments, the ECP includes three types of ECP:

Type 1: a correction value for correcting a first positioning measurement of the downlink PRS sent by each downlink PRS beam of a candidate base station;

Type 2: an estimation of an error range of a first positioning measurement of the downlink PRS sent by each downlink PRS beam of a candidate base station; or Type 3: an identifier for determining whether a downlink PRS sent by each downlink PRS beam of a candidate base station satisfies an integrity monitoring condition.

In some embodiments, the processor is further configured to: receive ECPs sent by preset IM reference devices, and obtain a synthesized ECP by performing a combined calculation on the ECPs of the preset IM reference devices;

sending the ECP, includes sending the synthesized ECP.

In some embodiments, when sending the ECP, the processor is configured to: send the ECP to a Location Management Function (LMF) entity or a terminal.

In some embodiments, when sending the ECP, the processor is configured to: send the ECP to a preset IM reference device, which a synthesized ECP is obtained by the preset IM reference device via performing a combined calculation on ECPs from preset IM reference devices.

On the LMF entity side, an information communication device provided by an embodiment of the present application includes:

a memory configured to store program instructions;

a processor configured to invoke the program instructions stored in the memory and the program instructions, when executed by the processer, cause the processor to perform a process of:

sending downlink PRS parameter configuration information; and receiving an ECP; where the ECP is determined based on a downlink PRS corresponding to the downlink PRS parameter configuration information.

In some embodiments, the ECP includes three types of ECP:

Type 1: a correction value for correcting a first positioning measurement of the downlink PRS sent by each downlink PRS beam of a candidate base station;

Type 2: an estimation of an error range of a first positioning measurement of the downlink PRS sent by each downlink PRS beam of a candidate base station; or Type 3: an identifier for determining whether a downlink PRS sent by each downlink PRS beam of a candidate base station satisfies a preset integrity monitoring condition.

In some embodiments, the processor is further configured to:

determine a second positioning measurement according to the ECP and based on the first positioning measurement reported by a terminal; and determine a terminal position based on the second positioning measurement.

In some embodiments, for the Type 1 of the ECP, the processor is configured to determine the second positioning measurement based on the first positioning measurement reported by the terminal in a following manner:

$$TDOA\_v2=TDOA\_v1-ECP\_TDOA\_Error;$$

where TDOA_v1 represents the first positioning measurement, ECP_TDOA_Error represents the correction value, and TDOA_v2 represents the second positioning measurement.

In some embodiments, for the Type 2 of the ECP, the processor is configured to determine the second positioning measurement based on the first positioning measurement reported by the terminal in a following manner:

taking the first positioning measurement as the second positioning measurement in case that the estimation of the error range is less than a preset threshold value.

In some embodiments, for the Type 3 of the ECP, the processor is configured to determine the second positioning measurement based on the first positioning measurement reported by the terminal in a following manner:

taking the first positioning measurement as the second positioning measurement in response to the identifier indicating that whether the downlink PRS satisfies the preset integrity monitoring condition.

In some embodiments, the processor is further configured to:

receive terminal position information reported by a terminal.

On the terminal side, an information communication device provided by an embodiment of the present application includes:

a memory configured to store program instructions;

a processor configured to invoke the program instructions stored in the memory and the program instructions, when executed by the processer, cause the processor to perform a process of:

obtaining downlink PRS parameter configuration information from an LMF entity; and obtaining a first positioning measurement by measuring a downlink PRS based on the downlink PRS parameter configuration information.

In some embodiments, the processor is further configured to:

report the first positioning measurement to the LMF entity.

In some embodiments, the processor is further configured to:

receive an ECP;

determine a second positioning measurement based on the ECP and the first positioning measurement;

determine terminal position information based on the second positioning measurement; and report the terminal position information to the LMF entity.

In some embodiments, the ECP includes three types of ECP:

Type 1: a correction value for correcting a first positioning measurement of the downlink PRS sent by each downlink PRS beam of a candidate base station;

Type 2: an estimation of an error range of a first positioning measurement of the downlink PRS sent by each downlink PRS beam of a candidate base station; or Type 3: an identifier for determining whether a downlink PRS sent by each downlink PRS beam of a candidate base station satisfies a preset integrity monitoring condition.

In some embodiments, for the Type 1 of the ECP, the processor is configured to determine the second positioning measurement based on the ECP and the first positioning measurement in a following manner:

$$TDOA\_v2=TDOA\_v1-ECP\_TDOA\_Error;$$

where TDOA_v1 represents the first positioning measurement, ECP_TDOA_Error represents the correction value corresponding to the ECP, and TDOA_v2 represents the second positioning measurement.

In some embodiments, for the Type 2 of the ECP, the processor is configured to determine the second positioning measurement based on the ECP and the first positioning measurement in a following manner:

taking the first positioning measurement as the second positioning measurement in case that the estimation of the error range is less than a preset threshold value.

In some embodiments, for the Type 3 of the ECP, the second positioning measurement is determined based on the ECP and the first positioning measurement in a following manner:

taking the first positioning measurement as the second positioning measurement in response to the identifier indicating that the downlink PRS satisfies the preset integrity monitoring condition.

On the base station side, an information communication device provided by an embodiment of the present application includes:

a memory configured to store program instructions;

a processor configured to invoke the program instructions stored in the memory and the program instructions, when executed by the processer, cause the processor to perform a process of:

obtaining downlink PRS parameter configuration information from an LMF entity; and sending a downlink PRS to a terminal and a preset IM reference device based on the downlink PRS parameter configuration information.

On the IM reference device side, an information communication device provided by this embodiment of the present application includes:

an obtaining device configured to obtain downlink PRS parameter configuration information;

a measurement device configured to measure a downlink PRS from a base station based on the downlink PRS parameter configuration information, and generate an ECP; and a sending device configured to send the ECP.

On the LMF entity side, an information communication device provided by an embodiment of the present application includes:

a sending device configured to send downlink PRS parameter configuration information; and a receiving device configured to receive an ECP; where the ECP is determined based on a downlink PRS corresponding to the downlink PRS parameter configuration information.

On the terminal side, an information communication device provided by an embodiment of the present application includes:

an obtaining device configured to obtain downlink PRS parameter configuration information from an LMF entity; and a measurement device configured to obtain a first positioning measurement by measuring a downlink PRS based on the downlink PRS parameter configuration information.

On the base station side, an information communication device provided by an embodiment of the present application includes:

an obtaining device configured to obtain downlink PRS parameter configuration information from an LMF entity; and a sending device configured to send a downlink PRS to a terminal and a preset IM reference device based on the downlink PRS parameter configuration information.

Another embodiment of the present application provides a computing device, which includes a memory and a processor, where the memory is configured to store the program instructions, and the processor is configured to invoke the program instructions stored in the memory and the program instructions, when executed by the processer, cause the processor to perform any one of the above-mentioned methods.

Another embodiment of the present application provides a computer storage medium storing a computer program thereon, and the program, when executed by a processor, implements any one of the above-mentioned methods.

BRIEF DESCRIPTION OF THE DRAWINGS

Embodiments of the present application more clearly, the accompanying figures which need to be used in describing embodiments will be introduced below briefly. The accompanying figures described below are only some embodiments of the present application.

DETAILED DESCRIPTION OF THE EMBODIMENTS

Figure 1:
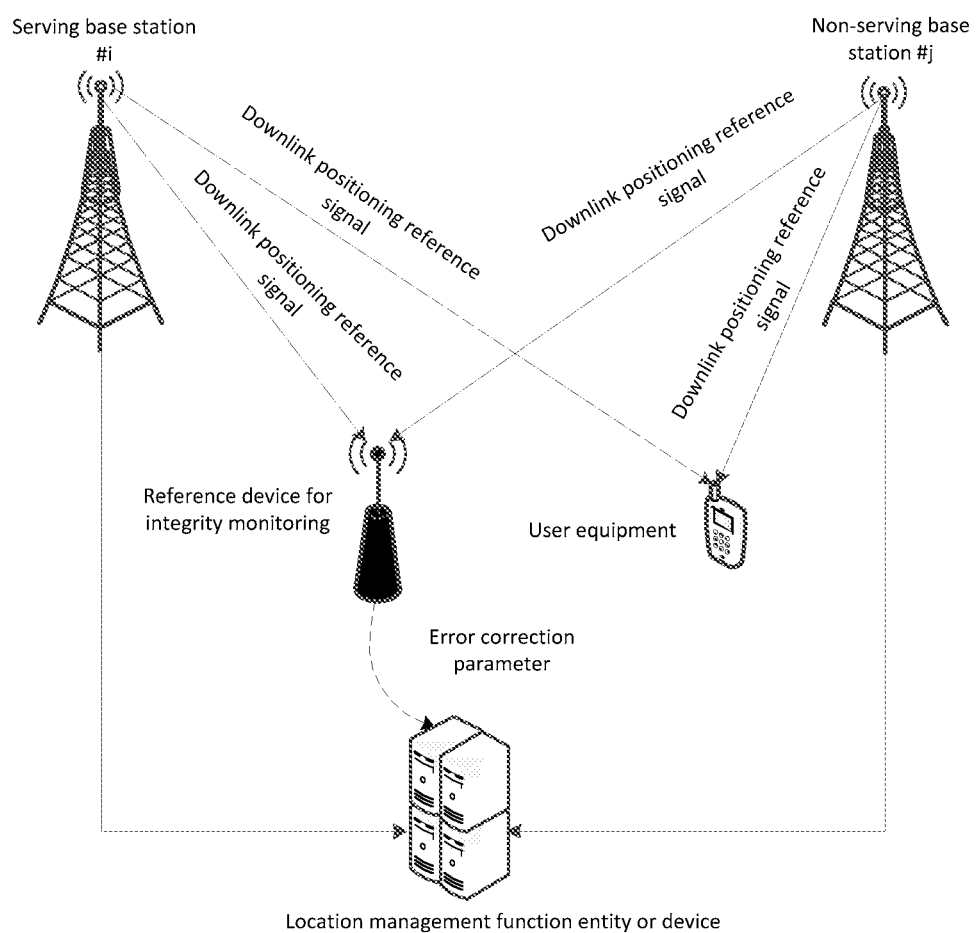
FIG. 1 is a schematic diagram of a network-assisted integrity monitoring and UE-assisted positioning solution according to an embodiment of the present application.

The technical solutions in embodiments of the present application will be described clearly and completely below in combination with the accompanying drawings in embodiments of the present application. The described embodiments are only a part of embodiments of the present application but not all embodiments. Based upon the embodiments of the present application, embodiments of the present application.

There is no requirement for "Integrity Monitoring (IM)" in the 3GPP Release 16 (Rel-16) and past releases. The upcoming work item of 3GPP New Radio (NR) Release 17 (Rel-17) positioning enhancement function takes the implementation of integrity monitoring as a work objective. The Rel-16 version only meets the positioning accuracy, and does not introduce the quality of service requirement for "integrity". The "integrity" is the confidence level for the accuracy of the positioning data provided by a positioning system and a measure of the ability to provide a timely and effective warning to a user when the positioning system does not meet expected operating conditions, and is applicable to various scenarios that affect the safety of life and property and will bring the legal liability. In the downlink radio-based (RAT-dependent) positioning system, the time offset of the base station, the failure of the base station transmitter, the multipath channel, the Non-Line of Sight (NLOS) channel and others are a part of the key issues that directly affect the positioning accuracy and integrity. Therefore, the embodiments of the present application propose an integrity monitoring solution for downlink RAT-dependent positioning.

Embodiments of the present application provide an information communication method and device, to realize the integrity monitoring of the downlink 3GPP RAT-dependent positioning network, and thus eliminate the influence of factors such as the time offset of the base station, the failure of the base station transmitter, the multipath channel and the non-line of sight channel.

Here, the method and device are based on the same application concept. Since the principle of solving the problem in the method is similar to that in the apparatus, the implementations of the device and method can refer to each other, and the repeated description thereof will be omitted.

Embodiments of the present application will be described below in detail with reference to the drawings of the specification. It should be noted that the showing order of embodiments of the present application only represents the sequential order of embodiments, but does not represent the pros and cons of the technical solutions provided by embodiments.

In addition to monitoring whether the system meets the integrity requirement, the technical solution provided by embodiments of the present application also has the function of error correction.

The technical solution provided by an embodiment of the present application is as follow.

In the RAT-dependent positioning network (eg, DL-TDOA positioning, Multi-RTT positioning, DL AoD positioning) using an NR downlink Positioning Reference Signal (PRS) for positioning, one or more Integrity Monitoring (IM) reference devices (Reference and Integrity Monitoring Stations (RIMSs)) are introduced, to measure the downlink PRS of each downlink PRS beam from the base station (Transmit and Receive Point (TRP)) and generate an Error Correction Parameter (ECP) for each base station or each downlink PRS beam.

Here, the ECP may be a correction parameter used to eliminate a measurement error obtained by a terminal (User Equipment (UE)) by measuring the downlink PRS, or may be indication information that a downlink PRS beam of a certain TRP or all downlink PRSs of a certain TRP is/are not suitable for RAT-dependent positioning.

Then, the IM reference device sends the ECP to the LMF or the UE.

The LMF or the UE can use the ECP provided by the IM reference device to eliminate the influence of errors in the process of calculating the UE position, to satisfy the integrity monitoring condition.

Here, the IM reference device is located at a known position in the positioning network, and may be a network device installed separately from the base station and the UE, or may be a reference UE at a known position, or may be a reference base station at a known position. When there are preset IM reference devices in a service area, an integrity monitoring network can be formed, and all IM reference devices in the network are connected to each other, to improve the reliability of integrity monitoring and accelerate the speed of integrity monitoring.

The technical solution provided by the embodiments of the present application will be described below from different device sides.

IM reference device

1. The IM reference device obtains the downlink PRS parameter configuration information from a Location Management Function (LMF) entity or a base station.

Here, the downlink PRS parameter configuration information, for example, includes sending time-frequency domain resources, bandwidth, Quasi Co-Location (QCL) beam indication information, etc.

Here, the PRS includes but is not limited to NR PRS, Synchronization Signal (SS)/Physical Broadcast Channel (PBCH) Block (SS/PBCH Block, SSB), Channel-State Information RS (CSI-RS), etc.

The PRS is available for all NR frequency ranges, including a first frequency range (Frequency Range 1 (410 MHz-7125 MHz), FR1) and a second frequency range (Frequency Range 2 (24250 MHz-52600 MHz), FR2).

Here, the RAT-dependent positioning includes all positioning technical solutions using the NR downlink PRS for positioning, for example: Downlink-Time Difference of Arrival (DL-TDOA) positioning, Multi-cell Round Trip Time (Multi-RTT) positioning, Downlink (DL) Angle of Departure (AoD) positioning.

2. The IM reference device measures the downlink PRS of each downlink PRS beam from the base station based on the obtained downlink PRS parameter configuration information, and generates an Error Correction Parameter (ECP) for each base station or each downlink PRS beam.

Here, the ECP may be a total calibration parameter caused by multiple error sources (for example, the time offset of the base station, the failure of the base station transmitter, etc.), or may be a separate calibration parameter for a single error source, for example, the separate calibration for the time offset of the base station, the multipath channel, the Non-Line Of Sight (NLOS) channel, etc.

Here, the separate calibration of multipath channel, NLOS or the like needs to meet a specific condition, that is, the integrity monitoring can be performed based on the IM reference device only when the actual position of the reference device is close to that of the target UE and when the conditions of multipath channels and NLOS channels of them are basically the same.

In some embodiments, the ECP includes but is not limited to three types of ECP.

Type 1: a correction value for correcting a first positioning measurement of the downlink PRS sent by each downlink PRS beam of a candidate base station, where the first positioning measurement includes but is not limited to: Time of Arrival (TOA), Time Difference of Arrival (TDOA) (that is, Reference Signal Time Difference (RSTD)) and UE Rx-Tx time difference, etc.

Type 2: an estimation of an error range of a first positioning measurement of the downlink PRS sent by each downlink PRS beam of a candidate base station.

Type 3: an identifier for determining whether a downlink PRS sent by each downlink PRS beam of a candidate base station satisfies an integrity monitoring condition.

2.a. When there are N IM reference devices in the system (N is an integer greater than 1), all IM reference devices calculate the respective ECPs respectively and then transmit them to an IM reference device, and this IM reference device performs the combined calculation to obtain a synthesized ECP. For example, for the above three ECP types, the following processes may be performed respectively to obtain the synthesized ECP:

for the Type 1 of the EPC: calculate an average or a weighted average of N ECP values;

for the Type 2: calculate an average or a weighted average of N ECP values;

for the Type 3: perform the logical "AND" or logical "OR" operation on N ECP values.

3. For different positioning methods, the IM reference device sends the generated ECP to the LMF or the UE. Here, when there are N IM reference devices in the system (N is an integer greater than 1), the IM reference device performing the combined calculation sends the synthesized ECP to the LMF or the UE in this step.

Here, there may be at least two methods for the IM reference device to send the ECP to the UE: (1) send the ECP to the LMF at first, and then the LMF forwards it to the UE separately; (2) broadcast the ECP to the neighboring UE directly.

3.1. For the UE-assisted downlink positioning method, the IM reference device sends the generated ECP to the LMF for the UE-assisted positioning calculation, where the ECP may be used by the LMF to calculate the accurate UE position, and where the IM reference device may send the ECP to the LMF in different ways, for example, through a wired connection, or the IM reference device is wirelessly connected to the serving base station and then wired from the serving base station to the LMF.

3.2. For the UE-based downlink positioning method, the IM reference device firstly sends the generated ECP to the LMF, and the LMF forwards the ECP to the UE separately; or the IM reference device directly broadcasts the ECP to the neighboring UE for the UE-based positioning calculate, where the ECP is used by the UE to calculate the accurate UE position. This method requires the IM reference device to send broadcast messages. For example, when the IM reference device is a reference UE, the reference UE broadcasts through the Sidelink of Vehicle to Everything (V2X), which has the advantage of smaller time delay and is more suitable for real-time location with smaller target delay.

LMF

1. The LMF sends the downlink PRS parameter configuration information (including: sending time-frequency domain resources, bandwidth, QCL beam indication information, etc.) to the base station, the IM reference device, and the UE.

2. The LMF receives a first positioning measurement (including but not limited to: RSTD (TDOA), RSRP, and UE Rx-Tx time difference) reported by the UE.

3. For different positioning methods, the LMF implements different processes.

3.1. For UE-assisted positioning 3.1.1. The LMF receives an Error Correction Parameter (ECP) reported by the IM reference device.

3.1.2. The LMF corrects the first positioning measurement or selects an effective first positioning measurement according to the received ECP, to obtain a second positioning measurement.

The ECP in Type 1 is a correction value for correcting the first positioning measurement (TDOA_v1) of each downlink PRS beam of the candidate base station, which is recorded as ECP_TDOA_Error, and the correction is performed according to the following formula to obtain the corrected second positioning measurement (TDOA_v2):

$$TDOA\_v2 = TDOA\_v1 - ECP\_TDOA\_Error.$$

The ECP in Type 2 is an estimation of the error range of the TOA measurement value of each downlink PRS beam of the candidate base station. When the error range is less than a predefined threshold value, the first positioning measurement is used as the second positioning measurement; otherwise, the first positioning measurement is not used as the second positioning measurement.

The ECP in Type 3 is an identifier for determining whether a downlink PRS sent by the candidate base station satisfies the integrity monitoring condition. When the identifier for determining whether the downlink PRS satisfies the preset integrity monitoring condition is true (that is, the preset integrity monitoring condition is satisfied), the first positioning measurement is used as the second positioning measurement; otherwise, the first positioning measurement corresponding to the base station is not used as the second positioning measurement.

3.1.3. The LMF calculates the UE position based on the second positioning measurement and the known position information of the base station, etc., to obtain the UE position. In addition, after obtaining the ECP, the LMF further obtains a Protection Level (PL) by calculation, and compares it with a predefined threshold value to determine whether the downlink positioning system is reliable (that is, whether the integrity condition is satisfied).

3.2. For UE-based positioning 3.2.1. The LMF receives the UE position information reported by the UE.

UE

1. The UE obtains the downlink PRS parameter configuration information (including: sending time-frequency domain resources, bandwidth, QCL beam indication information, etc.) and/or the position information of the base station from the LMF, where the position information of the base station is sent only in the case of UE-based positioning.

2. The UE measures the downlink PRS based on the obtained downlink PRS parameter configuration information, to obtain a first positioning measurement.

3. For different positioning methods, the UE implements different processes.

3.1. For UE-assisted positioning, the UE reports the first positioning measurement to the LMF.

3.2. For UE-based positioning 3.2.1. The UE receives an Error Correction Parameter (ECP) reported by the IM reference device.

3.2.2. The UE corrects the first positioning measurement or selects an effective first positioning measurement based on the ECP, to obtain a second positioning measurement.

The ECP in Type 1 is a correction value for correcting the first positioning measurement (TDOA_v1) of each downlink PRS beam of the candidate base station, which is recorded as ECP_TDOA_Error, and the correction is performed according to the following formula to obtain the corrected second positioning measurement (TDOA_v2):

$$TDOA\_v2 = TDOA\_v1 - ECP\_TDOA\_Error.$$

The ECP in Type 2 is an estimation of the error range of the TOA measurement value of each downlink PRS beam of the candidate base station. When the error range is less than a predefined threshold value, the positioning measurement is used as the second positioning measurement; otherwise, the positioning measurement is not used as the second positioning measurement.

The ECP in Type 3 is an identifier for determining whether a downlink PRS sent by the candidate base station satisfies the integrity monitoring condition. When the identifier for determining whether the downlink PRS satisfies the preset integrity monitoring condition is true, the first positioning measurement corresponding to the base station is used as the second positioning measurement; otherwise, the positioning measurement is not used as the second positioning measurement.

3.2.3. The UE calculates the UE position based on the second positioning measurement and the obtained position information of the base station, etc., to obtain the UE position. In addition, after obtaining the ECP, the UE further obtains a PL by calculation, and compares it with a pre-defined threshold value to determine whether the downlink positioning system is reliable (that is, whether the integrity condition is satisfied).

3.2.4. The UE reports the UE position information to the LMF.

Base Station

1. The base station obtains the downlink PRS parameter configuration information (including: sending time-frequency domain resources, bandwidth, QCL beam indication information, etc.) from the LMF.

2. The base station sends the downlink PRS to the IM reference device and the UE.

Several embodiments are given below for illustration.

Embodiment 1: Network-Assisted Integrity Monitoring and UE-Assisted Positioning Solution As shown in FIG. 1, the Embodiment 1 is a network-assisted integrity monitoring and UE-assisted positioning solution. The IM reference device is a separate network device different from the base station and the UE, or is a reference base station, and is installed at a known position in the network.

IM reference device

1. The IM reference device obtains the downlink PRS parameter configuration information (including: sending time-frequency domain resources, bandwidth, QCL beam indication information, etc.) from the LMF or base station, where the PRS includes but is not limited to NR PRS, SSB, CSI-RS, etc., and may be used for FR1 and FR2.

2. The IM reference device detects the downlink PRS of each downlink PRS beam from the base station based on the obtained downlink PRS parameter configuration information, and generates an Error Correction Parameter (ECP) for each base station or each downlink PRS beam, where the ECP may be a total calibration parameter caused by multiple error sources (for example, the time offset of the base station, the failure of the base station transmitter, etc.), or may be a separate calibration parameter for a single error source, for example, the separate calibration for the time offset, the multipath channel, the Non-Line Of Sight (NLOS), etc. Here, the separate calibration of multipath channel, NLOS or the like needs to meet a specific condition, that is, the integrity monitoring can be performed based on the IM reference device only when the actual position of the reference device is close to that of the target UE and when the conditions of multipath channels and NLOS channels of them are basically the same.

In some embodiments, the ECP includes but is not limited to three types of ECP:

Type 1: a correction value for correcting the TOA measurement value of the downlink PRS sent by each downlink PRS beam of a candidate base station;

Type 2: an estimation of the error range of the TOA measurement of the downlink PRS sent by each downlink PRS beam of the candidate base station; or Type 3: an identifier for determining whether a downlink PRS sent by the candidate base station satisfies the integrity monitoring condition.

3. For different positioning methods, the IM reference device sends the generated ECP to the LMF.

3.1. For the UE-assisted downlink positioning method, the IM reference device sends the generated ECP to the LMF for the UE-assisted positioning calculation, where the ECP may be used by the LMF to calculate the accurate UE position, and where the IM reference device may send the ECP to the LMF in different ways, for example, through a wired connection, or the IM reference device is wirelessly connected to the serving base station and then wired from the serving base station to the LMF.

LMF

1. The LMF sends the downlink PRS parameter configuration information (including: sending time-frequency domain resources, bandwidth, QCL beam indication information, etc.) to the base station, the IM reference device, and the UE.

2. The LMF receives a first positioning measurement (including but not limited to: RSTD (TDOA), RSRP (Reference Signal Receiving Power), and UE Rx-Tx time difference) reported by the UE. The TDOA is taken as an example for description below.

3. For different positioning methods, the LMF implements different processes.

3.1. For UE-assisted positioning 3.1.1. The LMF receives an Error Correction Parameter (ECP) reported by the IM reference device.

3.1.2. The LMF corrects the first positioning measurement or selects an effective first positioning measurement according to the received ECP, to obtain a second positioning measurement.

The ECP in Type 1 is a correction value for correcting the first TDOA positioning measurement (TDOA_v1) of each downlink PRS beam of the candidate base station, which is recorded as ECP_TDOA_Error, and the correction is performed according to the following formula to obtain the corrected second TDOA positioning measurement (TDOA_v2):

$$TDOA\_v2 = TDOA\_v1 - ECP\_TDOA\_Error.$$

The ECP in Type 2 is an estimation of the error range representing the TOA measurement value of each downlink PRS beam of the candidate base station. When the estimation of the error range is less than a predefined threshold value, the positioning measurement is used as the second positioning measurement; otherwise, the positioning measurement is not used as the second positioning measurement.

The ECP in Type 3 is an identifier for determining whether a downlink PRS sent by the candidate base station satisfies the integrity monitoring condition. If this identifier is true (that is, the integrity monitoring condition is satisfied), the first positioning measurement corresponding to the base station is used as the second positioning measurement; otherwise, the positioning measurement is not used as the second positioning measurement.

3.1.3. The LMF calculates the UE position based on the second positioning measurement and the known position information of the base station, etc., to obtain the UE position.

UE

1. The UE obtains the downlink PRS parameter configuration information (including: sending time-frequency domain resources, bandwidth, QCL beam indication information, etc.) and/or the position information of the base station from the LMF, where the position information of the base station is sent only in the case of UE-based positioning.

2. The UE measures the downlink PRS based on the obtained downlink PRS parameter configuration information, to obtain a first positioning measurement.

3. For different positioning methods, the UE implements different processes.

3.1. For UE-assisted positioning, the UE reports the first positioning measurement to the LMF.

Base Station

1. The base station obtains the downlink PRS parameter configuration information (including: sending time-frequency domain resources, bandwidth, QCL beam indication information, etc.) from the LMF.

2. The base station sends the downlink PRS to the IM reference device and the UE.

Embodiment 2: UE-Assisted Integrity Monitoring and UE-Based Positioning

Figure 2:
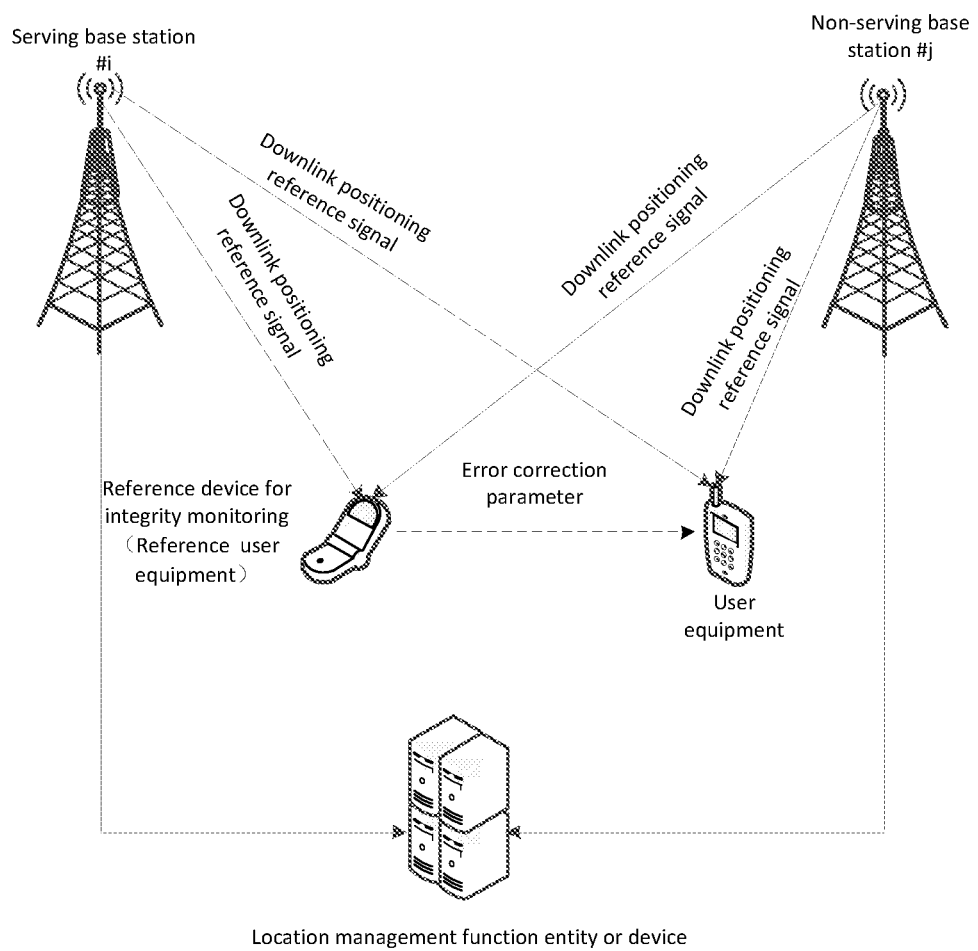
FIG. 2 is a schematic diagram of a UE-assisted integrity monitoring and UE-based positioning solution according to an embodiment of the present application.

As shown in FIG. 2, the Embodiment 2 is a UE-assisted integrity monitoring and UE-based positioning solution. The IM reference device is a reference UE, and is installed at a known position in the network.

IM reference device

1. The IM reference device obtains the downlink PRS parameter configuration information (including: sending time-frequency domain resources, bandwidth, QCL beam indication information, etc.) from the LMF or base station, where the PRS includes but is not limited to NR PRS, SSB, CSI-RS, etc., and may be used for FR1 and FR2.

2. The IM reference device detects the downlink PRS of each downlink PRS beam from the base station based on the obtained downlink PRS parameter configuration information, and generates an Error Correction Parameter (ECP) for each base station or each downlink PRS beam, where the ECP may be a total calibration parameter caused by multiple error sources (for example, the time offset of the base station, the failure of the base station transmitter, etc.), or may be a separate calibration parameter for a single error source, for example, the separate calibration for the time offset, the multipath channel, the Non-Line Of Sight (NLOS), etc. Here, the separate calibration of multipath channel, NLOS or the like needs to meet a specific condition, that is, the integrity monitoring can be performed based on the IM reference device only when the actual position of the reference device is close to that of the target UE and when the conditions of multipath channels and NLOS channels of them are basically the same.

In some embodiments, the ECP includes but is not limited to three types of ECP:

Type 1: a correction value for correcting the TOA measurement value of the downlink PRS sent by each downlink PRS beam of a candidate base station;

Type 2: an estimation of the error range of the TOA measurement of the downlink PRS sent by each downlink PRS beam of the candidate base station;

Type 3: an identifier for determining whether a downlink PRS sent by the candidate base station satisfies the integrity monitoring condition.

3. For different positioning methods, the IM reference device sends the generated ECP to the UE.

3.2. For the UE-based downlink positioning method, the IM reference device broadcasts the generated ECP to the neighboring UE for the UE-based positioning calculation, where the ECP is used by the UE to calculate the accurate UE position. This method requires the IM reference device to have the ability to send broadcast messages. For example, when the IM reference device is the reference UE, the reference UE broadcasts through the PC5 link of V2X, which has the advantage of smaller time delay and is more suitable for real-time location with smaller target delay.

LMF

1. The LMF sends the downlink PRS parameter configuration information (including: sending time-frequency domain resources, bandwidth, QCL beam indication information, etc.) to the base station, the IM reference device, and the UE.

2. The LMF receives a first positioning measurement (including but not limited to: RSTD (TDOA), RSRP, and UE Rx-Tx time difference) reported by the UE.

3. For different positioning methods, the LMF implements different processes.

3.2. For UE-based positioning 3.2.1. The LMF receives the UE position information reported by the UE.

UE

1. The UE obtains the downlink PRS parameter configuration information (including: sending time-frequency domain resources, bandwidth, QCL beam indication information, etc.) and/or the position information of the base station from the LMF, where the position information of the base station is sent only in the case of UE-based positioning.

2. The UE measures the downlink PRS based on the obtained downlink PRS parameter configuration information, to obtain a first positioning measurement, including but not limited to: RSTD (TDOA), RSRP, and UE Rx-Tx time difference. The TDOA is taken as an example for description below.

3. For different positioning methods, the UE implements different processes.

3.2. For UE-based positioning 3.2.1. The UE receives an Error Correction Parameter (ECP) reported by the IM reference device.

3.2.2. The UE corrects the first positioning measurement or selects an effective first positioning measurement based on the ECP, to obtain a second positioning measurement.

The ECP in Type 1 is a correction value for correcting the first TDOA positioning measurement (TDOA_v1) of each downlink PRS beam of the candidate base station, which is recorded as ECP_TDOA_Error, and the correction is performed according to the following formula to obtain the corrected second TDOA positioning measurement (TDOA_v2):

$$TDOA\_v2 = TDOA\_v1 - ECP\_TDOA\_Error.$$

The ECP in Type 2 is an estimation of the error range representing the TOA measurement value of each downlink PRS beam of the candidate base station. When the estimation of the error range is less than a predefined threshold value, the positioning measurement is used as the second positioning measurement; otherwise, the positioning measurement is not used as the second positioning measurement.

The ECP in Type 3 is an identifier for determining whether a downlink PRS sent by the candidate base station satisfies the integrity monitoring condition. If this identifier is true, that is, the integrity monitoring condition is satisfied, the first positioning measurement corresponding to the base station is used as the second positioning measurement; otherwise, the positioning measurement is not used as the second positioning measurement.

3.2.3. The UE calculates the UE position based on the second positioning measurement and the obtained position information of the base station, etc., to obtain the UE position.

3.2.4. The UE reports the UE position information to the LMF.

Base Station

1. The base station obtains the downlink PRS parameter configuration information (including: sending time-frequency domain resources, bandwidth, QCL beam indication information, etc.) from the LMF.

2. The base station sends the downlink PRS to the IM reference device and the UE.

Figure 3:
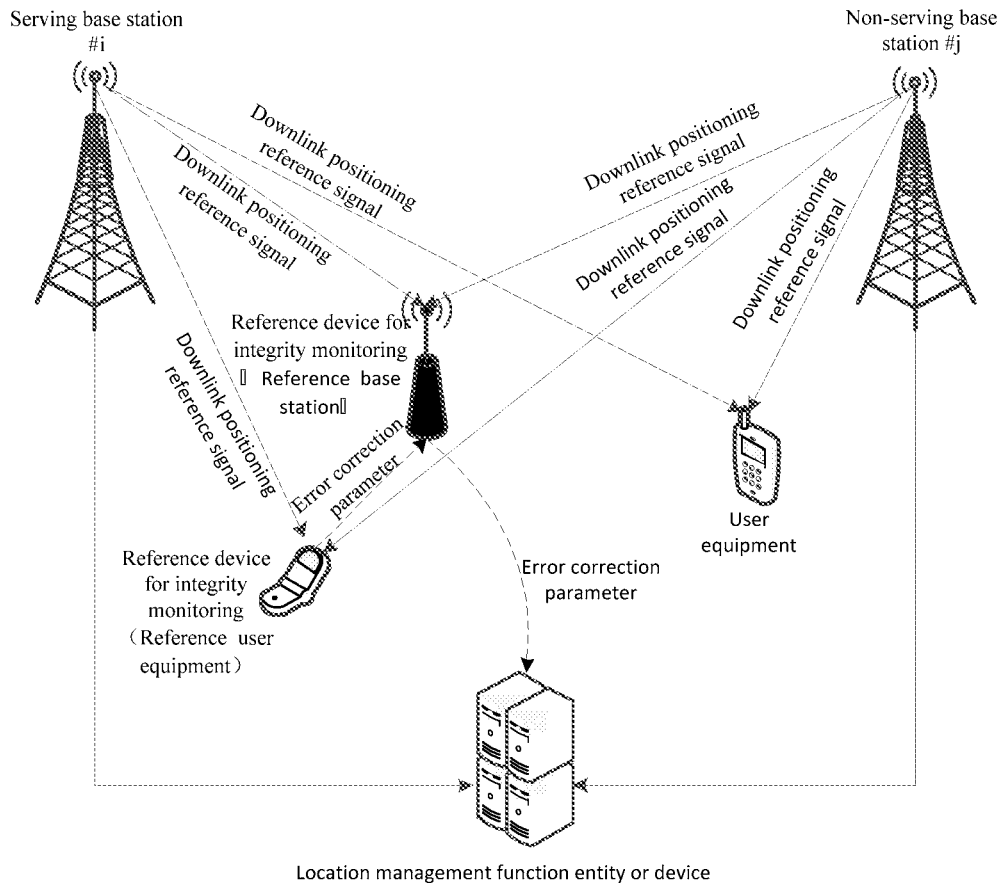
FIG. 3 is a schematic diagram of network-assisted and UE-assisted integrity monitoring and UE-assisted positioning according to an embodiment of the present application.

Embodiment 3: Network-Assisted and UE-Assisted Integrity Monitoring and UE-Assisted Positioning As shown in FIG. 3, the Embodiment 3 is a network-assisted and UE-assisted integrity monitoring and UE-assisted positioning solution. The IM reference devices include a reference base station and a reference UE, which are respectively installed at fixed positions in the network.

The difference between Embodiment 3 and Embodiment 1 is that there are two IM reference devices. Therefore, only the IM reference devices are described below, and the processing steps of the LMF, UE and base station are may be similar as those in the Embodiment 1 and will not be repeated here.

Here, the process of step 2.a is newly added after step 2 for the IM reference devices.

IM reference devices (reference base station and reference UE)

1. The IM reference device obtains the downlink PRS parameter configuration information (including: sending time-frequency domain resources, bandwidth, QCL beam indication information, etc.) from the LMF or base station, where the PRS includes but is not limited to NR PRS, SSB, CSI-RS, etc., and may be used for FR1 and FR2.

2. The IM reference device detects the downlink PRS of each downlink PRS beam from the base station based on the obtained downlink PRS parameter configuration information, and generates an Error Correction Parameter (ECP) for each base station or each downlink PRS beam, where the ECP may be a total calibration parameter caused by multiple error sources (for example, the time offset of the base station, the failure of the base station transmitter, etc.), or may be a separate calibration parameter for a single error source, for example, the separate calibration for the time offset, the multipath channel, the Non-Line Of Sight (NLOS), etc. Here, the separate calibration of multipath channel, NLOS or the like needs to meet a specific condition, that is, the integrity monitoring can be performed based on the IM reference device only when the actual position of the reference device is close to that of the target UE and when the conditions of multipath channels and NLOS channels of them are basically the same.

In some embodiments, the ECP includes but is not limited to three types of ECP:

Type 1: a correction value for correcting the TOA measurement value of the downlink PRS sent by each downlink PRS beam of a candidate base station;

Type 2: an estimation of the error range of the TOA measurement of the downlink PRS sent by each downlink PRS beam of the candidate base station;

Type 3: an identifier for determining whether a downlink PRS sent by the candidate base station satisfies the integrity monitoring condition.

2.a. The reference base station and the reference UE obtain their respective ECPs respectively after implementing step 1 and step 2 respectively, and then the reference UE sends its own ECP to the reference base station, and the reference base station performs the combined calculation to obtain a synthesized ECP. For example, the reference base station obtains a first error correction parameter ECP_v1, the reference UE obtains a second error correction parameter ECP_v2, and then the processing is respectively performed according to three ECP types:

Type 1: calculate an average or a weighted average of two ECP values, and the obtained value is recorded as ECP_v3, for example:

$$ECP\_v3=\tfrac{1}{2}*(ECP\_v1+ECP\_v2);$$

Type 2: calculate an average or a weighted average of two ECP values, and the obtained value is recorded as ECP_v3, for example:

$$ECP\_v3=\tfrac{1}{2}*(ECP\_v1+ECP\_v2);$$

Type 3: perform the logical "AND" or logical "OR" operation on two ECP values, and the obtained value is recorded as ECP_v3, for example:

$$ECP\_v3=ECP\_v1 \text{ AND } ECP\_v2.$$

3. For different positioning methods, the IM reference device sends the generated ECP_v3 to the LMF.

3.1. For the UE-assisted downlink positioning method, the IM reference device sends the generated ECP to the LMF for the UE-assisted positioning calculation, where the ECP may be used by the LMF to calculate the accurate UE position, and where the IM reference device may send the ECP to the LMF in different ways, for example, through a wired connection, or the IM reference device is wirelessly connected to the serving base station and then wired from the serving base station to the LMF.

To sum up, the embodiments of the present application introduce one or more Integrity Monitoring (IM) reference devices into the downlink RAT-dependent positioning network, to measure the downlink PRS of each downlink PRS beam from the base station and generate an Error Correction Parameter (ECP) for each base station or each downlink PRS beam. Then the IM reference device sends the ECP to the LMF or the UE to eliminate the influence of errors in the process of calculating the position of the UE, to satisfy the integrity monitoring condition.

It should be noted that the integrity monitoring condition described in the embodiments of the present application may be determined according to actual needs and is not limited in the embodiments of the present application.

Figure 4:
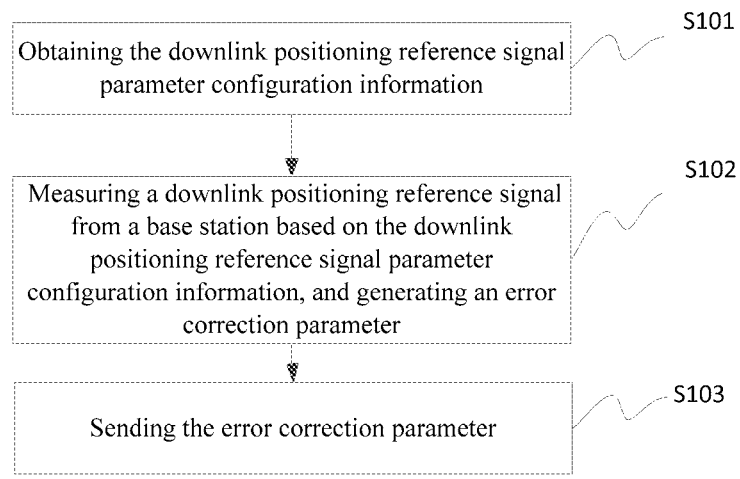
FIG. 4 is a schematic flowchart of an information communication method on the IM reference device side according to an embodiment of the present application.

Referring to FIG. 4, an information communication method on the side of an IM reference device provided by an embodiment of the present application includes:

S101: obtaining the downlink PRS parameter configuration information;

S102: measuring a downlink PRS from a base station based on the downlink PRS parameter configuration information, and generating an ECP; and S103: sending the ECP.

With this method, the downlink PRS parameter configuration information is obtained, the downlink PRS from the base station is measured based on the downlink PRS parameter configuration information, the ECP is generated, and the ECP is sent, to realize the integrity monitoring of the downlink 3GPP RAT-dependent positioning network, and eliminating the influence of factors such as the time offset of the base station, the failure of the base station transmitter, the multipath channel and the non-line of sight channel.

In some embodiments, the ECP includes three types of ECP:
Type 1: a correction value for correcting a first positioning measurement of the downlink PRS sent by each downlink PRS beam of a candidate base station;
Type 2: an estimation of an error range of the first positioning measurement of the downlink PRS sent by each downlink PRS beam of the candidate base station; or
Type 3: an identifier for determining whether a downlink PRS sent by each downlink PRS beam of the candidate base station satisfies an integrity monitoring condition.

In some embodiments, when there are preset IM reference devices, on the side of the IM reference device that performs the combined calculation, the method further includes: receiving ECPs sent by preset IM reference devices, and obtaining a synthesized ECP by performing a combined calculation on the ECPs of the preset IM reference devices; the sending the ECP, includes sending the synthesized ECP.

In some embodiments, the sending the ECP includes sending the ECP to a Location Management Function (LMF) entity or a terminal.

In some embodiments, when there are preset IM reference devices, on the side of the IM reference device that does not perform the combined calculation, sending the ECP includes: sending the ECP to a preset IM reference device, which a synthesized ECP is obtained by the preset IM reference device via performing a combined calculation on ECPs from preset IM reference devices.

Figure 5:
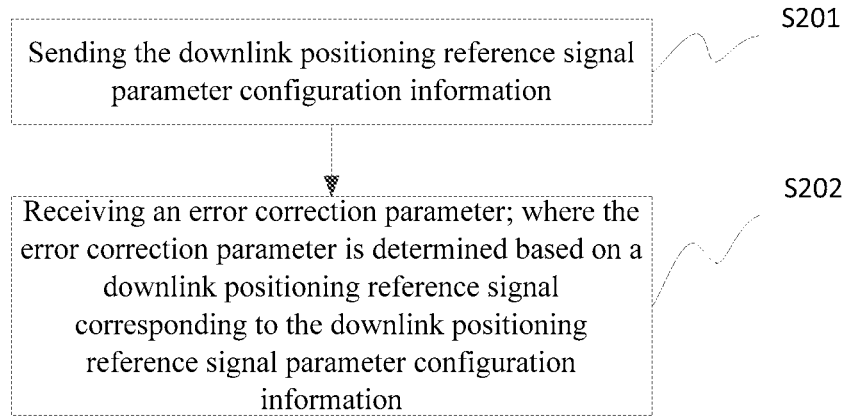
FIG. 5 is a schematic flowchart of an information communication method on the LMF entity side according to an embodiment of the present application.

Referring to FIG. 5, an information communication method on the LMF entity side provided by an embodiment of the present application includes:
S201: sending the downlink PRS parameter configuration information;
S202: receiving an ECP; where the ECP is determined based on a downlink PRS corresponding to the downlink PRS parameter configuration information.

In some embodiments, the ECP includes three types of ECP:
Type 1: a correction value for correcting a first positioning measurement of the downlink PRS sent by each downlink PRS beam of a candidate base station;
Type 2: an estimation of an error range of the first positioning measurement of the downlink PRS sent by each downlink PRS beam of the candidate base station;
Type 3: an identifier for determining whether a downlink PRS sent by each downlink PRS beam of the candidate base station satisfies a preset integrity monitoring condition.

In some embodiments, the method further includes:
determining a second positioning measurement according to the ECP and the first positioning measurement reported by a terminal;
determining a terminal position based on the second positioning measurement.

In some embodiments, for the Type 1 of the ECP, the second positioning measurement is determined based on the first positioning measurement reported by the terminal in a following manner:

$$TDOA\_v2 = TDOA\_v1 - ECP\_TDOA\_Error;$$

where TDOA_v1 represents the first positioning measurement, ECP_TDOA_Error represents the correction value, and TDOA_v2 represents the second positioning measurement.

In some embodiments, for the Type 2 of the ECP, the second positioning measurement is determined based on the first positioning measurement reported by the terminal in a following manner:
taking the first positioning measurement as the second positioning measurement in response to the estimation of the error range being less than a preset threshold value.

In some embodiments, for the Type 3 of the ECP, the second positioning measurement is determined based on the first positioning measurement reported by the terminal in a following manner:
taking the first positioning measurement as the second positioning measurement in response to the identifier indicating that the downlink PRS satisfies the preset integrity monitoring condition.

In some embodiments, the method further includes:
receiving terminal position information reported by a terminal.

Figure 6:
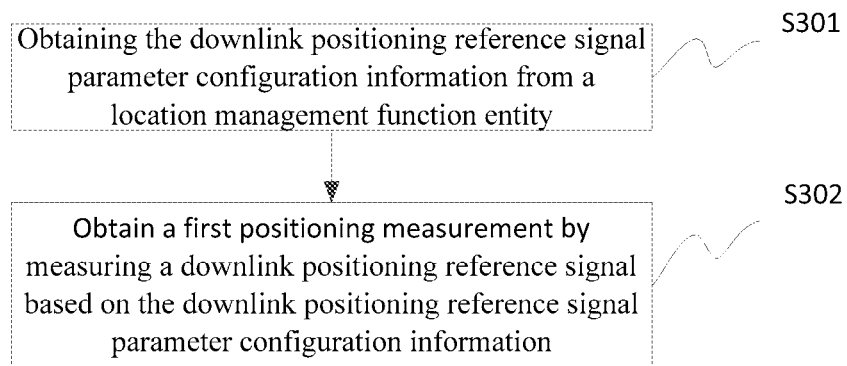
FIG. 6 is a schematic flowchart of an information communication method on the UE side according to an embodiment of the present application.

Referring to FIG. 6, an information communication method on the UE side provided by an embodiment of the present application includes:
S301: obtaining the downlink PRS parameter configuration information from an LMF entity; and
S302: obtaining a first positioning measurement by measuring a downlink PRS based on the downlink PRS parameter configuration information.

In some embodiments, the method further includes:
reporting the first positioning measurement to the LMF entity.

In some embodiments, the method further includes:
receiving an ECP;
determining a second positioning measurement based on the ECP and the first positioning measurement;
determining terminal position information based on the second positioning measurement;
reporting the terminal position information to the LMF entity.

In some embodiments, the ECP includes three types of ECP:
Type 1: a correction value for correcting a first positioning measurement of the downlink PRS sent by each downlink PRS beam of a candidate base station;
Type 2: an estimation of an error range of the first positioning measurement of the downlink PRS sent by each downlink PRS beam of the candidate base station;
Type 3: an identifier for determining whether a downlink PRS sent by each downlink PRS beam of the candidate base station satisfies a preset integrity monitoring condition.

In some embodiments, for the Type 1, the second positioning measurement is determined based on the ECP and the first positioning measurement in a following manner:

$$TDOA\_v2 = TDOA\_v1 - ECP\_TDOA\_Error;$$

where TDOA_v1 represents the first positioning measurement, ECP_TDOA_Error represents the correction value corresponding to the ECP, and TDOA_v2 represents the second positioning measurement.

In some embodiments, for the Type 2, the second positioning measurement is determined based on the ECP and the first positioning measurement in a following manner:

taking the first positioning measurement as the second positioning measurement in case that the estimation of the error range is less than a preset threshold value.

In some embodiments, for the Type 3, the second positioning measurement is determined based on the ECP and the first positioning measurement in a following manner:

taking the first positioning measurement as the second positioning measurement in response to the identifier indicating that the downlink PRS satisfies the preset integrity monitoring condition.

Figure 7:
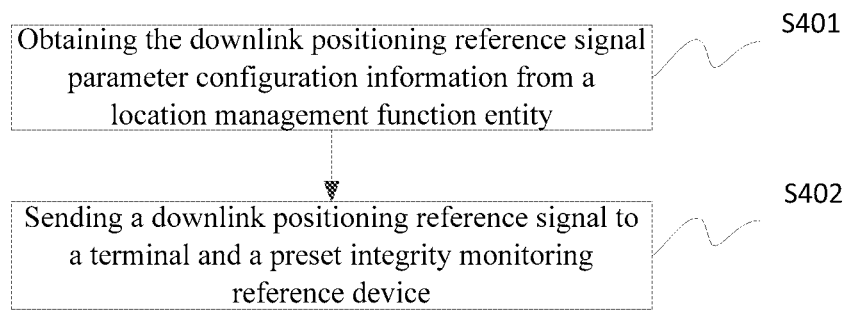
FIG. 7 is a schematic flowchart of an information communication method on the base station side according to an embodiment of the present application.

Referring to FIG. 7, an information communication method on the base station side provided by an embodiment of the present application includes:

S401: obtaining the downlink PRS parameter configuration information from an LMF entity; and S402: sending a downlink PRS to a terminal and a preset IM reference device based on the downlink PRS parameter configuration information.

Figure 8:
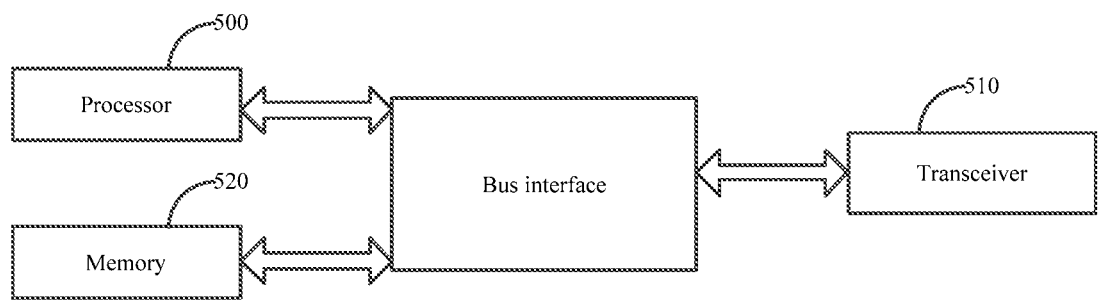
FIG. 8 is a schematic structural diagram of an information communication device on the network side according to an embodiment of the present application.

Referring to FIG. 8, an information communication device on the network side (which may be an IM reference device, an LMF entity, or a base station) provided by an embodiment of the present application includes:

a memory 520 configured to store program instructions;

a processor 500 configured to invoke the program instructions stored in the memory, and execute corresponding functions according to an obtained program.

1. The device is an IM reference device.

The processor 500 is configured to invoke the program instructions stored in the memory, and execute according to an obtained program:

obtaining the downlink PRS parameter configuration information via a transceiver 510;

measuring a downlink PRS from a base station based on the downlink PRS parameter configuration information;

generating an ECP; and sending the ECP via the transceiver 510.

In some embodiments, the ECP includes three types of ECP:

Type 1: a correction value for correcting a first positioning measurement of the downlink PRS sent by each downlink PRS beam of a candidate base station;

Type 2: an estimation of an error range of the first positioning measurement of the downlink PRS sent by each downlink PRS beam of the candidate base station; or Type 3: an identifier for determining whether a downlink PRS sent by each downlink PRS beam of the candidate base station satisfies an integrity monitoring condition.

In some embodiments, when there are preset IM reference devices, on the side of the IM reference device that performs the combined calculation, the processor 500 is further configured to: receive ECPs sent by preset IM reference devices via the transceiver 510, and obtain a synthesized ECP by performing a combined calculation on the ECPs of the preset IM reference devices;

sending the ECP, includes sending the synthesized ECP.

In some embodiments, sending the ECP includes sending the ECP to an LMF entity or a terminal via the transceiver 510.

In some embodiments, when there are preset IM reference devices, on the side of the IM reference device that does not perform the combined calculation, sending the ECP includes: sending the ECP via the transceiver 510 to a preset IM reference device, which performs a combined calculation on ECPs from preset IM reference devices to obtain a synthesized ECP.

2. The device is an LMF entity.

The processor 500 is configured to invoke the program instructions stored in the memory, and execute according to an obtained program:

sending the downlink PRS parameter configuration information via the transceiver 510; and receiving an ECP via the transceiver 510; where the ECP is determined based on a downlink PRS corresponding to the downlink PRS parameter configuration information.

In some embodiments, the ECP includes three types of ECP:

Type 1: a correction value for correcting a first positioning measurement of the downlink PRS sent by each downlink PRS beam of a candidate base station;

Type 2: an estimation of an error range of the first positioning measurement of the downlink PRS sent by each downlink PRS beam of the candidate base station; or Type 3: an identifier for determining whether a downlink PRS sent by each downlink PRS beam of the candidate base station satisfies a preset integrity monitoring condition.

In some embodiments, the processor 500 is further configured to:

determine a second positioning measurement according to the ECP and the first positioning measurement reported by a terminal; and determine a terminal position based on the second positioning measurement.

In some embodiments, for the Type 1 of the ECP, the processor 500 determines the second positioning measurement based on the first positioning measurement reported by the terminal in a following manner:

$$TDOA\_v2 = TDOA\_v1 - ECP\_TDOA\_Error;$$

where TDOA_v1 represents the first positioning measurement, ECP_TDOA_Error represents the correction value, and TDOA_v2 represents the second positioning measurement.

In some embodiments, for the Type 2 of the ECP, the processor 500 determines the second positioning measurement based on the first positioning measurement reported by the terminal in a following manner:

taking the first positioning measurement as the second positioning measurement in case that the estimation of the error range is less than a preset threshold value.

In some embodiments, for the Type 3 of the ECP, the processor 500 determines the second positioning measurement based on the first positioning measurement reported by the terminal in a following manner:

taking the first positioning measurement as the second positioning measurement in response to the identifier indicating that the downlink PRS satisfies the preset integrity monitoring condition.

In some embodiments, the processor 500 is further configured to:

receive the terminal position information reported by a terminal via the transceiver 510.

3. The device is a base station.

The processor 500 is configured to invoke the program instructions stored in the memory, and execute according to an obtained program:

obtaining the downlink PRS parameter configuration information from an LMF entity via the transceiver 510; and sending a downlink PRS to a terminal and a preset IM reference device via the transceiver 510 based on the downlink PRS parameter configuration information.

The transceiver 510 is configured to receive and send the data under the control of the processor 500.

Here, in FIG. 8, the bus architecture may include any numbers of interconnected buses and bridges, and link various circuits of one or more processors represented by the processor 500 and the memory represented by the memory 520. The bus architecture may further link various other circuits such as peripheral device, voltage regulator and power management circuit, which are all well known in the art and thus will not be further described again herein. The bus interface provides an interface. The transceiver 510 may be elements, i.e., include a transmitter and a receiver, and provide the devices for communicating with various other devices over the transmission media. The processor 500 is responsible for managing the bus architecture and general processing, and the memory 520 may store the data used by the processor 500 when performing the operations.

The processor 500 may be Central Processing Unit (CPU), Application Specific Integrated Circuit (ASIC), Field-Programmable Gate Array (FPGA) or Complex Programmable Logic Device (CPLD).

Figure 9:
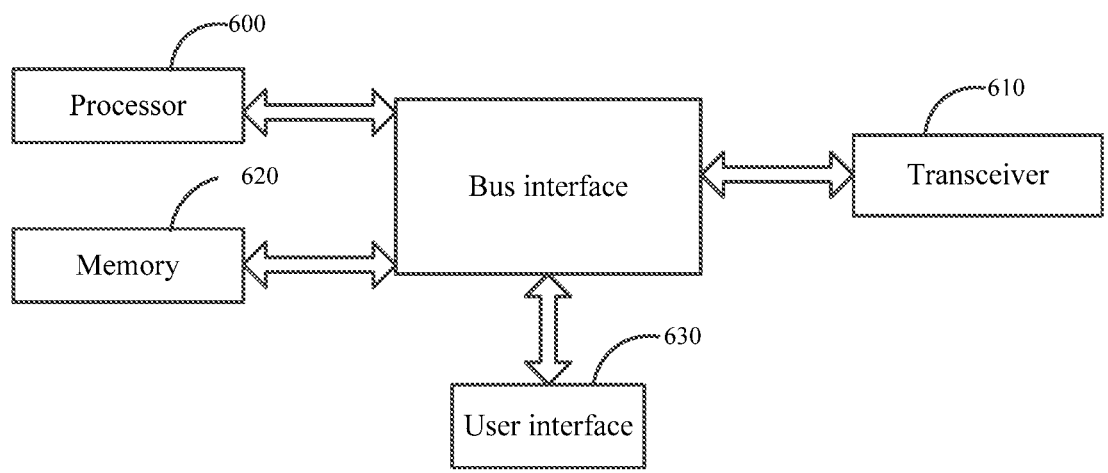
FIG. 9 is a schematic structural diagram of an information communication device on the terminal side according to an embodiment of the present application.

Referring to FIG. 9, an information communication device on the terminal side provided by an embodiment of the present application includes:

a memory 620 configured to store program instructions;

a processor 600 configured to invoke the program instructions stored in the memory, and execute according to an obtained program:

obtaining the downlink PRS parameter configuration information from an LMF entity via a transceiver 610; and measuring a downlink PRS based on the downlink PRS parameter configuration information to obtain a first positioning measurement.

In some embodiments, the processor 600 is further configured to:

report the first positioning measurement to the LMF entity via the transceiver 610.

In some embodiments, the processor 600 is further configured to:

receive an ECP via the transceiver 610;

determine a second positioning measurement based on the ECP and the first positioning measurement;

determine terminal position information based on the second positioning measurement; and report the terminal position information to the LMF entity via the transceiver 610.

In some embodiments, the ECP includes three types of ECP:

Type 1: a correction value for correcting a first positioning measurement of the downlink PRS sent by each downlink PRS beam of a candidate base station;

Type 2: an estimation of an error range of the first positioning measurement of the downlink PRS sent by each downlink PRS beam of the candidate base station; or Type 3: an identifier for determining whether a downlink PRS sent by each downlink PRS beam of the candidate base station satisfies a preset integrity monitoring condition.

In some embodiments, for the Type 1, the processor 600 determines the second positioning measurement based on the ECP and the first positioning measurement in a following manner:

$$TDOA\_v2 = TDOA\_v1 - ECP\_TDOA\_Error;$$

where TDOA_v1 represents the first positioning measurement, ECP_TDOA_Error represents the correction value corresponding to the ECP, and TDOA_v2 represents the second positioning measurement.

In some embodiments, for the Type 2, the processor 600 determines the second positioning measurement based on the ECP and the first positioning measurement in a following manner:

taking the first positioning measurement as the second positioning measurement in case that the estimation of the error range is less than a preset threshold value.

In some embodiments, for the Type 3, the processor 600 determines the second positioning measurement based on the ECP and the first positioning measurement in a following manner:

taking the first positioning measurement as the second positioning measurement in response to the identifier indicating that the downlink PRS satisfies the preset integrity monitoring condition.

The transceiver 610 is configured to receive and send the data under the control of the processor 600.

Here, in FIG. 9, the bus architecture may include any numbers of interconnected buses and bridges, and link various circuits of one or more processors represented by the processor 600 and the memory represented by the memory 620. The bus architecture may further link various other circuits such as peripheral device, voltage regulator and power management circuit, which are all well known in the art and thus will not be further described again herein. The bus interface provides an interface. The transceiver 610 may be elements, i.e., include a transmitter and a receiver, and provide the devices for communicating with various other devices over the transmission media. For different user equipments, the user interface 630 may also be the interface to inter-connect or exter-connect with the required devices, and the connected devices include but not limited to keypad, display, loudspeaker, microphone, joystick, and the like.

The processor 600 is responsible for managing the bus architecture and general processing, and the memory 620 may store the data used by the processor 600 when performing the operations.

In some embodiments, the processor 600 may be Central Processing Unit (CPU), Application Specific Integrated Circuit (ASIC), Field-Programmable Gate Array (FPGA) or Complex Programmable Logic Device (CPLD).

Figure 10:
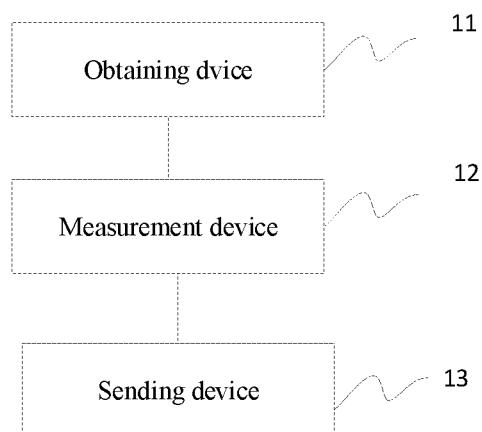
FIG. 10 is a schematic structural diagram of an information communication device on the IM reference device side according to an embodiment of the present application.

Referring to FIG. 10, an information communication device on the IM reference device side provided by an embodiment of the present application includes:

an obtaining device 11 configured to obtain downlink PRS parameter configuration information;

a measurement device 12 configured to measure a downlink PRS from a base station based on the downlink PRS parameter configuration information, and generate an ECP; and a sending device 13 configured to send the ECP.

Figure 11:
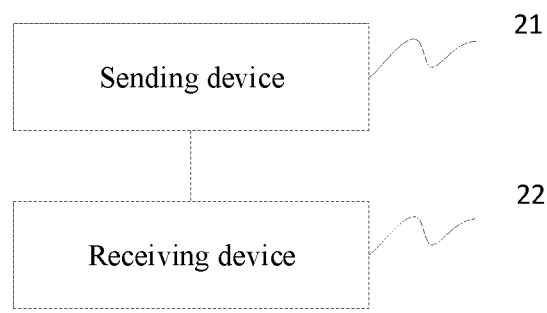
FIG. 11 is a schematic structural diagram of an information communication device on the LMF entity side according to an embodiment of the present application.

Referring to FIG. 11, an information communication device on the LMF entity side provided by an embodiment of the present application includes:

a sending device 21 configured to send downlink PRS parameter configuration information; and a receiving device 22 configured to receive an ECP; where the ECP is determined based on a downlink PRS corresponding to the downlink PRS parameter configuration information.

Figure 12:
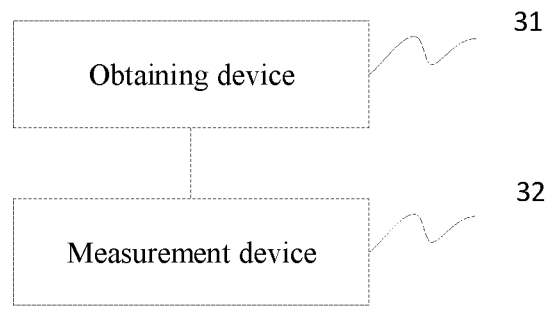
FIG. 12 is a schematic structural diagram of an information communication device on the UE side according to an embodiment of the present application.

Referring to FIG. 12, an information communication device on the UE side provided by an embodiment of the present application includes:

an obtaining device 31 configured to obtain downlink PRS parameter configuration information from an LMF entity;

a measurement device 32 configured to obtain a first positioning measurement by measuring a downlink PRS based on the downlink PRS parameter configuration information.

Figure 13:
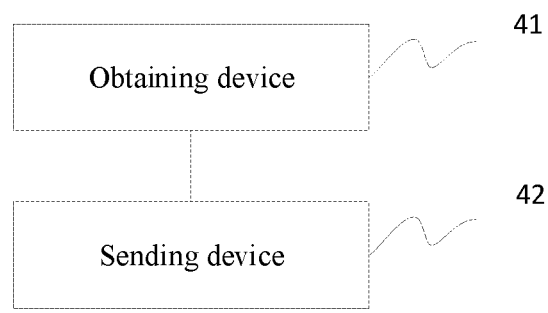
FIG. 13 is a schematic structural diagram of an information communication device on the base station side according to an embodiment of the present application.

Referring to FIG. 13, an information communication device on the base station side provided by an embodiment of the present application includes:

an obtaining device 41 configured to obtain downlink PRS parameter configuration information from an LMF entity; and a sending device 42 configured to send a downlink PRS to a terminal and a preset IM reference device based on the downlink PRS parameter configuration information.

It should be noted that the division of devices in the embodiments of the present application is illustrative, and is merely a logical function division, and there may be other division methods in actual implementations. In addition, the functional devices in each embodiment of the present application may be integrated into one processing device, or each device may exist alone physically, or two or more devices may be integrated into one device. The above-mentioned integrated devices can be implemented in the form of hardware, or can be implemented in the form of software functional devices.

When the integrated device is implemented in the form of software functional device and sold or used as an independent product, it may be stored in a computer readable storage medium. Based on such understanding, the technical solution of the present application essentially or a part that contributes to the prior art or all or a part of the technical solution may be embodied in the form of software product. The computer software product is stored in a storage medium, and includes several instructions used to enable a computer device (which may be a personal computer, server, or network device, etc.) or a processor to perform all or some of the steps of the methods of various embodiments of the present application. The above-mentioned storage medium includes USB flash drive, mobile hard disk, Read-Only Memory (ROM), Random Access Memory (RAM), magnetic disk or compact disc or various media that can store the program codes.

An embodiment of the present application provides a computing device, which can be a desktop computer, a portable computer, a smart phone, a tablet computer, a Personal Digital Assistant (PDA) or the like. The computing device can include a Center Processing Unit (CPU), a memory, input/output devices and the like. The input device can include a keyboard, a mouse, a touch screen and the like, and the output device can include a display device such as Liquid Crystal Display (LCD), Cathode Ray Tube (CRT) or the like.

The memory can include a Read-Only Memory (ROM) and a Random Access Memory (RAM), and provide the program instructions and data stored in the memory to the processor. In an embodiment of the present application, the memory may be used to store the program of any one of the methods provided by the embodiments of the present application.

The processor invokes the program instructions stored in the memory and is configured to perform any one of the methods provided by the embodiments of the present application in accordance with the obtained program instructions.

An embodiment of the present application provides a computer storage medium for storing the computer program instructions used by the apparatuses provided by the embodiments of the present application described above, where the computer storage medium contains the program for performing any one of the methods provided by the embodiments of the present application described above.

The computer storage medium may be any available media or data storage device accessible to the computer, including but not limited to magnetic memory (e.g., floppy disk, hard disk, magnetic tape, Magnetic Optical disc (MO) or the like), optical memory (e.g., CD, DVD, BD, HVD or the like), semiconductor memory (e.g., ROM, EPROM, EEPROM, nonvolatile memory (NAND FLASH), Solid State Disk (SSD)) or the like.

The methods provided by the embodiments of the present application may be applied to the terminal devices, and may also be applied to the network devices.

Here, the terminal device can also refer to as the User Equipment ("UE" for short), Mobile Station ("MS" for short), Mobile Terminal ("MT" for short) or the like. In some embodiments, the terminal can have the ability of communicating with one or more core networks via the Radio Access Network (RAN). For example, the terminal can be a mobile telephone (or called "cellular" telephone), or a computer with the mobile property. For example, the terminal can also be a portable, pocket, handheld, computer built-in or vehicle-carried mobile device.

The base station (e.g., access point) included in the network device refers to a device in the access network communicating with wireless terminals via one or more sectors over the air interface. The base station may be used to perform the inter-conversion between the received air frame and the IP packet, and used as the router between the wireless terminal and the rest of the access network, where the rest of the access network may include Internet Protocol (IP) networks. The base station may further coordinate the attribute management of the air interface. For example, the base station can be the BTS in the GSM or CDMA, or can be the NodeB in the WCDMA, or can be the NodeB or eNB or e-NodeB (evolutional Node B) in the LTE, or can be the gNB in the 5G system, or the like. which Is not limited in the embodiments of the present application.

The processing flows of the above methods may be implemented by a software program, which may be stored in a storage medium. When the stored software program is invoked, the above method steps are performed.

To sum up, the embodiments of the present application propose an integrity monitoring solution for downlink RAT-dependent positioning. Compared with the prior art without integrity monitoring, the embodiments of the present application can eliminate the influence of the time offset of the base station, the failure of the base station transmitter, the multipath channel, and the Non-Line of Sight (NLOS) channel, etc., and improve the reliability of the system significantly.

The embodiments of the present application can provide methods, systems, and computer program products. Thus, the present application can take the form of hardware embodiments alone, software embodiments alone, or embodiments combining the software and hardware aspects. Also, the present application can take the form of computer program products implemented on one or more computer usable storage mediums (including but not limited to magnetic disk memories, optical memories, and the like) containing computer usable program codes therein.

The present application is described by reference to the flow charts and/or the block diagrams of the methods, the devices (systems) and the computer program products according to the embodiments of the present application. In some embodiments, process and/or block in the flow charts and/or the block diagrams, and a combination of processes and/or blocks in the flow charts and/or the block diagrams can be implemented by the computer program instructions. These computer program instructions can be provided to a general-purpose computer, a dedicated computer, an embedded processor, or a processor of another programmable data processing device to produce a machine, and an apparatus for implementing the functions specified in one or more processes of the flow charts and/or one or more blocks of the block diagrams is produced by the instructions executed by the computer or the processor of another programmable data processing device.

These computer program instructions can also be stored in a computer readable memory which is to guide the computer or another programmable data processing device to operate in a particular way, and the instructions stored in the computer readable memory produce a manufacture including the instruction apparatus which implements the functions specified in one or more processes of the flow charts and/or one or more blocks of the block diagrams.

These computer program instructions can also be loaded onto the computer or another programmable data processing device, and a series of operation steps are performed on the computer or another programmable device to produce the computer-implemented processing. Thus, the instructions executed on the computer or another programmable device provide steps for implementing the functions specified in one or more processes of the flow charts and/or one or more blocks of the block diagrams.

What is claimed is:

1. An information communication method, comprising:
   obtaining downlink Positioning Reference Signal, PRS, parameter configuration information from a Location Management Function, LMF, entity; and
   obtaining a first positioning measurement by measuring a downlink PRS based on the downlink PRS parameter configuration information;
   wherein the method further comprises:
   receiving an Error Correction Parameter, ECP;
   determining a second positioning measurement based on the ECP and the first positioning measurement;
   determining terminal position information based on the second positioning measurement; and
   reporting the terminal position information to the LMF entity.

2. The method according to claim 1, further comprising: reporting the first positioning measurement to the LMF entity.

3. The method according to claim 1, wherein the ECP comprises three types of ECP:
   Type 1: a correction value for correcting a first positioning measurement of the downlink PRS sent by each downlink PRS beam of a candidate base station;
   Type 2: an estimation of an error range of a first positioning measurement of the downlink PRS sent by each downlink PRS beam of a candidate base station; or
   Type 3: an identifier for determining whether a downlink PRS sent by each downlink PRS beam of a candidate base station satisfies a preset integrity monitoring condition.

4. The method according to claim 3, wherein for the Type 1 of the ECP, the second positioning measurement is determined based on the ECP and the first positioning measurement in a following manner:

$$TDOA\_v2 = TDOA\_v1 - ECP\_TDOA\_Error;$$

wherein $TDOA\_v1$ represents the first positioning measurement, $ECP\_TDOA\_Error$ represents the correction value corresponding to the ECP, and $TDOA\_v2$ represents the second positioning measurement; or wherein, for the Type 2 of the ECP, the second positioning measurement is determined based on the ECP and the first positioning measurement in a following manner:
taking the first positioning measurement as the second positioning measurement in case that the estimation of the error range is less than a preset threshold value; or wherein, for the Type 3 of the ECP, the second positioning measurement is determined based on the ECP and the first positioning measurement in a following manner:
taking the first positioning measurement as the second positioning measurement in response to the identifier indicating that the downlink PRS satisfies the preset integrity monitoring condition.

5. An information communication device, comprising:
a memory configured to store program instructions; and
a processor configured to invoke the program instructions stored in the memory;
wherein the program instructions, when executed by the processor, cause the processor to perform a process of:
obtaining downlink Positioning Reference Signal, PRS, parameter configuration information from a Location Management Function, LMF, entity; and
obtaining a first positioning measurement by measuring a downlink PRS based on the downlink PRS parameter configuration information;
wherein the program instructions, when executed by the processor, further cause the processor to perform a process of:
receiving an Error Correction Parameter, ECP;
determining a second positioning measurement based on the ECP and the first positioning measurement;
determining terminal position information based on the second positioning measurement; and
reporting the terminal position information to the LMF entity.

* * * * *